United States Patent
Grundy et al.

[15] 3,698,420
[45] Oct. 17, 1972

[54] DRAIN VALVE HAVING AUXILIARY SEAL

[72] Inventors: Douglas Grundy, East Islip; John E. Wills, Brightwaters, both of N.Y.

[73] Assignee: The United States of America as represented by the Secretary of the Navy

[22] Filed: Dec. 5, 1968

[21] Appl. No.: 781,487

[52] U.S. Cl. ............................ 137/329.06, 251/144
[51] Int. Cl. ..................... F16k 31/528, F16k 43/00
[58] Field of Search .................... 137/329–329.06, 137/329.1–329.4; 251/144, 215, 227, 339, 333, 334

[56] References Cited

UNITED STATES PATENTS

| | | | |
|---|---|---|---|
| 1,441,987 | 1/1923 | Lee | 137/329.4 |
| 2,796,882 | 6/1957 | Bradley | 137/329.4 |
| 2,983,385 | 5/1961 | Botstiber | 137/329.06 X |
| 3,022,797 | 2/1962 | Allin | 251/144 X |
| 3,405,729 | 10/1968 | Young et al. | 137/329.2 |

FOREIGN PATENTS OR APPLICATIONS

| | | | |
|---|---|---|---|
| 163,953 | 7/1958 | Sweden | 251/339 |

Primary Examiner—M. Cary Nelson
Assistant Examiner—David R. Matthews
Attorney—Edgar J. Brower, H. H. Losche and Paul S. Collignon

[57] ABSTRACT

A drain valve having a spring-biased poppet which has a first seal on one end for closing an aperture and a second seal spaced apart from said first seal for closing said aperture while said first seal is being replaced, and means for selectively positioning said first and second seals in sealing relation with said aperture.

4 Claims, 4 Drawing Figures

PATENTED OCT 17 1972

3,698,420

INVENTORS
DOUGLAS GRUNDY
JOHN E. WILLS

BY H. H. Losche
Paul S. Collignon

ATTORNEYS

3,698,420

DRAIN VALVE HAVING AUXILIARY SEAL

BACKGROUND OF THE INVENTION

The present invention relates to a drain valve for a vessel, such as a fuel tank, and more particularly to a valve having a first sealing means and an auxiliary sealing means for use while the first sealing means is being repaired or replaced.

Many vessels, such as fuel tanks or the like, are provided with drain valves so that contaminants may be easily drained. One common problem of these valves lies in the deterioration of the seals which prevents loss of the fluid when the vessel is being used. When the fluid and contaminants are being drained from the vessel, solid particles in the fluid, such as dirt or other foreign matter, pass through the valve and impinge on the seals. After a while, the valves began to leak and, if not repaired, can cause a dangerous condition particularly if the fluid is of a volatile nature.

Many vessels do not have any special provisions for repairing these drain valves and consequently, when it is desired to repair a valve, the vessel must be completely drained and the drain valve must be removed from the vessel for repair. As this type of maintenance can be both costly and time-consuming, some attempts have been made to facilitate repair without having to completely drain the vessel. One such device is shown and described in U. S. Pat. No. 3,026,897, entitled, "Drain Valve," which issued Mar. 27, 1962, to Edward R. Derrington and Robert F. Ray. In this patented device, two seals are provided, one being on a piston and the other being on a removable plug, with both seals being always simultaneously engaged and subjected to wear. The seal on the removable plug, however, can be replaced without having to drain the vessel, however, there are no provisions for replacing the seal on the piston which is being used as often as the seal on the removable plug.

SUMMARY OF THE INVENTION

The present invention provides first and second seals for a drain valve with the second seal being used only when the first valve is being repaired. Thus the second seal will have a much longer life than the first seal, and the vessel to which the drain valve is attached will not have to be completely drained for very long periods of time and perhaps not even once during the life of the vessel.

A valve housing is provided which has an enlarged bore section and a smaller bore section with the two bores being joined by a tapered section. The enlarged bore section is innermost in the vessel and the smaller bore section forms the aperture through which fluid can be drained from the vessel. A poppet is positioned in the valve housing and a first flange is provided on one end of the poppet and has a sealing ring engageable with the side wall of the smaller bore section. A second flange, greater in diameter than the first flange, is also provided on the same end of the poppet, but spaced apart from the first flange. The second flange is engageable with the tapered section joining the two bore sections and, when the second flange is engaged with the tapered section, the first flange extends out of and beyond the smaller bore section so that the sealing ring can be replaced.

It is therefore a general object of the present invention to provide a drain valve which can have a sealing ring replaced without having to drain the vessel to which the drain valve is attached.

Other objects and advantages of the present invention will be readily appreciated as the same becomes better understood by reference to the following detailed description when considered in connection with the accompanying drawing.

DESCRIPTION OF THE PREFERRED EMBODIMENT

Figure 1:
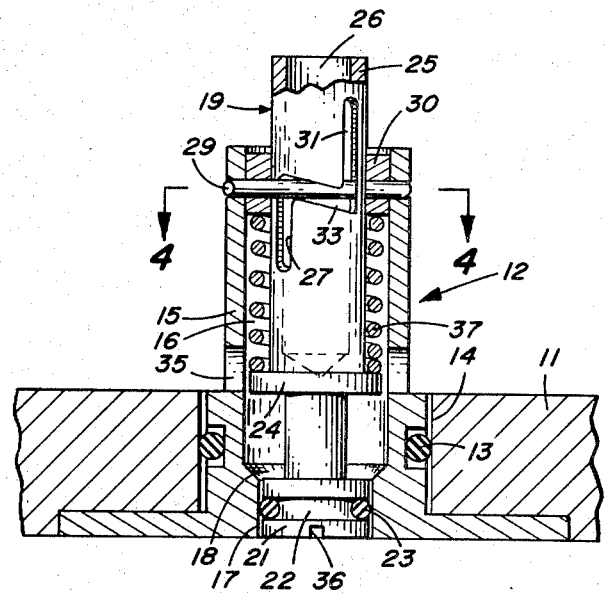
FIG. 1 is a partial sectional view showing a drain valve in a normally closed position.

Referring now to the drawing, there is shown a portion of the bottom 11 of a vessel to which a drain valve 12 is attached by any suitable means, such as rivets, screws or welding. A sealing ring 13 is provided between the side of a bore 14 in bottom 11 and the housing 15 of drain valve 12 in order to prevent leakage of fluid which is contained in the vessel.

Figure 2:
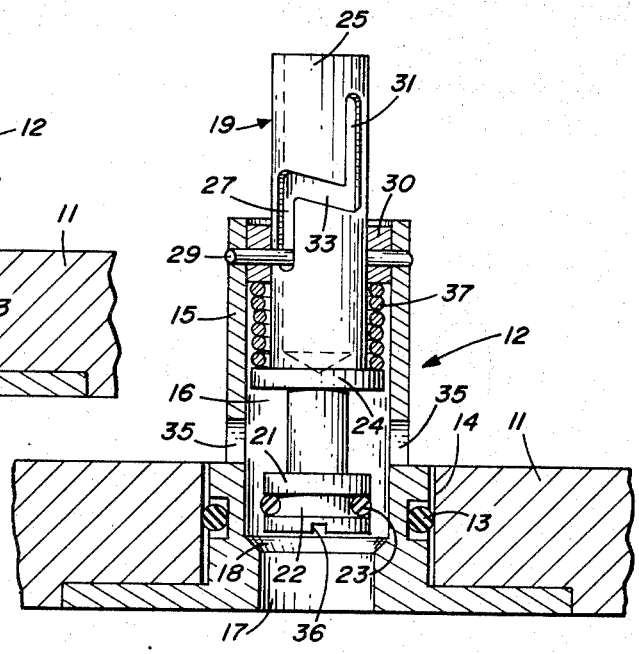
FIG. 2 is a view similar to FIG. 1 of the drawing only showing a drain valve in an open position.
Figure 3:
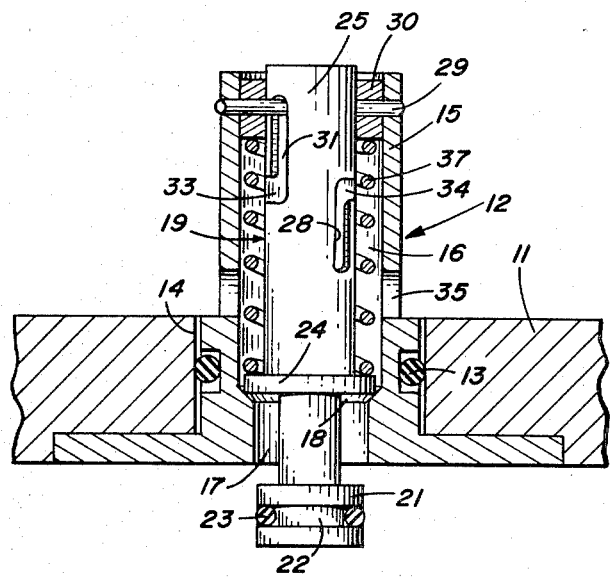
FIG. 3 is a view similar to FIG. 1 of the drawing only showing a drain valve in a secondary closed position.
Figure 4:
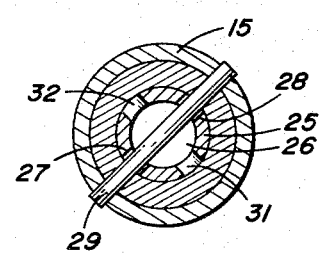
FIG. 4 is a sectional view taken on line 4—4 of FIG. 1.

Housing 15 is provided with an enlarged bore 16 and a smaller discharge bore 17, and these two bores are connected by a tapered bore 18. A poppet 19 is provided within housing 15 and has a first flange 21 which is slightly less in diameter than the diameter of bore 17. A groove 22 is provided in flange 21 and a sealing ring 23 is seated in groove 22 and engages the wall surface of bore 17 to provide a fluid seal. A second flange 24 is provided on poppet 19 and, as shown in FIG. 3 of the drawing, second flange 24 is engageable with tapered bore 18 to provide a secondary, or auxiliary, fluid seal. The upper extending stem 25 of poppet 19 is provided with a bore 26. A first pair of vertical extending slots 27 and 28 are provided in stem 25 and slots 27 and 28 are opposed one another so that pin 29 can pass through slot 27, bore 26, and slot 28. Pin 29 is press fitted through housing 15 and end cap 30 and thus is stationarily mounted. A second pair of vertical extending slots 31 and 32 are provided in stem 25 of poppet 19, and slots 31 and 32 are opposed one another and positioned midway between slots 27 and 28. Slots 27 and 31 are connected by a horizontally extending slot 33 and, likewise, slots 28 and 32 are connected by a horizontally extending slot 34. It can be seen that slots 31 and 32 extend above slots 27 and 28. When pin 29 is engaged with slots 27 and 28, as shown in FIGS. 1, 2, and 4 of the drawing, the length of slots 27 and 28 limit the amount of travel of poppet 19. As best shown in FIG. 1 of the drawing, when pin 29 is positioned at the top portion of slots 27 and 28, flange 21 and sealing ring 23 close bore 17, and when pin 29 is positioned at the bottom portion of slots 27 and 28, as shown in FIG. 2 of the drawing, bore 17 is open. Housing 15 is provided with one or more holes 35 that permit fluid in the vessel to be drained through bore 17.

Flange 21 is provided with a screwdriver slot 36 to facilitate turning of poppet 19, and when pin 29 is positioned in the top portion of slots 27 and 28, poppet 19 can be rotated and pin 29, which is stationary, can engage slots 31 and 32. As slots 31 and 32 extend above slots 27 and 28, when pin 29 is engaged with slots 31 and 32, poppet 19 can be lowered, as shown in FIG. 3 of the drawing so that flange 21 will extend out of bore 17 so that sealing ring 23 can be replaced. When flange 21 extends out of bore 17, flange 24 contacts tapered bore 18 and prevents loss of fluid from the vessel. A spring 37 is provided between flange 24 and end cap 30 to facilitate outward movement of poppet 19.

OPERATION

FIG. 1 of the drawing shows the drain valve in a normally closed position with flange 21 and sealing ring 23 preventing fluid within the vessel from passing out of bore 17. Spring 37 provides a biasing force for maintaining poppet 19 in position and the amount of downward travel of poppet 19 is limited by the length of slots 27 and 28.

Assuming now that it is desired to remove contaminants from a vessel, such as water from a gas tank, poppet 19 is moved upwardly, thereby compressing spring 37. Poppet 19 can readily be moved upwardly by inserting a small tool, such as the end of a screwdriver against the end of flange 21. Fluid from the bottom of the vessel will pass through holes 35 in housing 15 into bore 16 and then will be discharged through bore 17. When the contaminants have been removed, the tool depressing flange 21 can be removed and the force applied by spring 37 will return flange 21 and sealing ring 23 to the normally closed position, shown in FIG. 1 of the drawing.

When it is desired to replace sealing ring 23, poppet 19 is rotated 90 degrees by using a screwdriver which can be engaged with slot 36. Rotation of poppet 19, which is possible because of slots 33 and 34, causes pin 29 to be aligned with slots 31 and 32, and when so aligned, spring 37 moves poppet 19 downwardly, and flange 24 engages tapered bore 18 thereby preventing fluid in the vessel from draining through bore 17. As can be seen in FIG. 3 of the drawing, when flange 24 is engaged with tapered bore 18, flange 21 is clear from bore 17 and sealing ring 23 is readily accessible. Upon repair or replacement of sealing ring 23, the reverse procedure is followed so that pin 29 is again engaged with slots 27 and 28.

It can thus be seen that the present invention provides a drain valve which can readily have its seal replaced without having to completely drain the vessel to which the drain valve is attached. Obviously many modifications and variations of the present invention are possible in the light of the above teachings. For example, by eliminating bore 26 in stem 25, slot 27 would be a single through slot and, likewise, slot 31 would be a single through slot perpendicular to slot 27.

We claim:

1. A drain valve for a vessel comprising,
a valve housing having an enlarged bore section in one end and a smaller discharge bore section in the other end with a tapered bore section connecting said enlarged and smaller bore sections,
an annular poppet having a first enlarged diameter portion engageable with the side wall of said discharge bore section and a second enlarged diameter portion spaced from said first enlarged diameter portion, said second enlarged diameter portion being greater in diameter than said first enlarged diameter portion and being engageable with the surface of said tapered bore section,
first and second means on said annular poppet for selectively limiting the amount of travel of said annular poppet relative to said housing whereby said first enlarged diameter portion can be selected to engage said side wall of said discharge bore section and said second enlarged diameter portion can be selected to engage said surface of said tapered bore section, and
a spring for biasing said first enlarged diameter portion into engagement with said side wall of said discharge bore section when selected and for biasing said second enlarged diameter portion into engagement with said surface of said tapered bore section when selected.

2. A drain valve as set forth in claim 1 wherein said first and second means on said poppet for selectively limiting the amount of travel of said poppet comprises first and second slots selectively engaged with a pin stationarily attached to said valve housing.

3. A drain valve comprising:
housing means including a hollow tubular body member having a valve plate at one end thereof and open at its other end, said valve plate having a drain port coaxial with the longitudinal axis of said tubular body member, said tubular body member having at least one fluid inlet opening therein;
an end cap within said tubular body member partially closing said open end thereof;
a valve member movable in said body member;
spring means coacting between said end cap and said valve member biasing said valve member toward said drain port;
abutment means fixed in said tubular body member projecting from the inner wall thereof;
said valve member comprising a generally cylindrical body portion and a reduced diameter shank portion projecting from one end of said body portion and coaxial with said drain port; said shank portion having an annular groove concentric with said axis and receiving a drain port seal and said shank portion having a diameter only slightly smaller than the internal diameter of said drain port, said valve member further having a shoulder between said shank portion and said generally cylindrical body portion thereof;
said body portion of said valve member having a first slot having a top end and a bottom end and extending above said shoulder whereby said valve member occupies a normally closed position when said abutment means is positioned at said top end of said first slot with said drain port seal closing said drain port;
said valve member further having a second slot having a top end and a bottom end and being parallel to said first slot;
said valve member further having a transition slot connecting said top end of said first slot and said bottom end of said second slot whereby said valve member may be manipulated to position said transition slot in alignment with said abutment means and rotated to position said second slot in confronting relation to said abutment means, said valve member then being releaseable to permit said spring means to thrust said valve member toward said drain port whereupon said shank portion partially extends out of said drain port to expose said drain port seal and said shoulder seals against the inner edge of said drain port to provide a secondary seal for said drain valve while said drain port seal is exposed.

4. The improvement of claim 3 wherein said transition slot extends in a clockwise direction only, as viewed from the shank end of said valve member, from said first slot to said second slot.

* * * * *